UNITED STATES PATENT OFFICE.

JOHN T. RYAN, OF BROOKLYN, NEW YORK.

IMPROVEMENT IN THE MANUFACTURE OF SOAPS.

Specification forming part of Letters Patent No. 58,302, dated September 25, 1866.

*To all whom it may concern:*

Be it known that I, JOHN TAYLER RYAN, of Brooklyn, in the county of Kings and State of New York, have invented a new and useful Improvement in the Manufacture of Soaps; and I do hereby declare the following to be a full and exact description of the said invention.

The nature thereof consists in the combination of such vegetable gums or mucilages as do not yield a blue color when tested by iodine with any description of the soaps and saponaceous compounds known in commerce, for the purpose of rendering them more mild and emollient in their action, of increasing their transparency, and of preventing them from shrinking when exposed to the air.

Although I contemplate the use of any mucilages extracted from vegetables, and which are found free from starch when submitted to the iodine test, still I prefer the use of solutions derived from gums, or from algaceæ, and the natural order linaceæ. The desired mucilaginous or viscid solutions may be obtained from such vegetable substances by maceration in water, or by such other suitable means as may be found most convenient. I contemplate using greater or less quantities thereof, as shall be found desirable, in combination with the fats or fatty acids, resins, resinous substances, and other ingredients made use of in the composition of the soap or saponaceous compound, and they may be added to and combined with said ingredients at any stage of the process of manufacture, whatever that process may be.

I contemplate the admixture of the gummy or mucilaginous solutions with finished soaps by remelting the same for this purpose.

Having thus fully described my invention, what I claim therein as new, and desire to secure by Letters Patent, is—

The combination of solutions or mucilages obtained from algaceæ, linaceæ, acacia, or such other vegetables or vegetable substances as do not turn blue when tested with iodine, with soaps or saponaceous compounds, substantially in the manner and for the purpose herein set forth.

Witness my hand this 3d day of March, A. D. 1866.

JOHN T. RYAN.

In presence of—
F. W. TABER,
GEO. A. MAYHEW.